(12) United States Patent
Vinci et al.

(10) Patent No.: US 12,311,901 B2
(45) Date of Patent: May 27, 2025

(54) DIAGNOSTIC TOOL FOR ANTI-LOCK BRAKING SYSTEMS

(71) Applicants: Ian R. Vinci, Woodstock, NY (US); Peter R. Vinci, Woodstock, NY (US); Peter Vinci, Woodstock, NY (US)

(72) Inventors: Ian R. Vinci, Shandaken, NY (US); Peter R. Vinci, Shandaken, NY (US); Peter Vinci, Shandaken, NY (US); Richard A. Frantz, Hatboro, PA (US)

( * ) Notice: Subject to any disclaimer, the term of this patent is extended or adjusted under 35 U.S.C. 154(b) by 552 days.

(21) Appl. No.: 17/809,918

(22) Filed: Jun. 30, 2022

(65) Prior Publication Data

US 2023/0054729 A1    Feb. 23, 2023

Related U.S. Application Data

(60) Provisional application No. 63/260,368, filed on Aug. 18, 2021.

(51) Int. Cl.
*B60T 17/22*    (2006.01)

(52) U.S. Cl.
CPC ......... *B60T 17/221* (2013.01); *B60T 2270/10* (2013.01); *B60T 2270/406* (2013.01); *B60T 2270/415* (2013.01)

(58) Field of Classification Search
CPC ............... B60T 17/221; B60T 2270/10; B60T 2270/406; B60T 2270/415
See application file for complete search history.

(56) References Cited

U.S. PATENT DOCUMENTS

| | | | | |
|---|---|---|---|---|
| 4,831,868 A | * | 5/1989 | Makino | G01L 5/282 73/114.61 |
| 5,541,840 A | * | 7/1996 | Gurne | G01M 15/02 73/114.61 |
| 5,557,523 A | * | 9/1996 | Yeh | B60T 8/885 701/32.8 |

(Continued)

FOREIGN PATENT DOCUMENTS

| | | | | |
|---|---|---|---|---|
| DE | 10021232 B4 | * | 5/2014 | ............. B60D 1/06 |
| JP | 2007508194 A | * | 4/2007 | ............. B60D 1/62 |

(Continued)

*Primary Examiner* — Chico A Foxx
(74) *Attorney, Agent, or Firm* — LAW OFFICES OF MICHAEL L. WISE, LLC

(57) ABSTRACT

A diagnostic tool connected to an anti-lock braking system (ABS system) is described. The diagnostic tool is capable of powering on the ABS system and measuring the load current of the ABS system while the ABS system starts up. This startup load current signature is then compared to what is considered a normal startup load current signature. Such a comparison allows the diagnostic tool to determine whether the ABS system is functioning properly or whether there is a fault with the ABS system. Additional features on the diagnostic tool also allow the tool to communicate with the ABS system via power-line communications (PLC communications) and to determine whether there are any issues with those communications. Finally, the diagnostic tool is able to receive and translate any stored or active ABS fault codes generated by the ABS system and to display those fault codes to the user.

20 Claims, 4 Drawing Sheets

(56) References Cited

U.S. PATENT DOCUMENTS

| | | | | |
|---|---|---|---|---|
| 5,632,533 A * | 5/1997 | Kullmann | B60T 17/22 |
| | | | 303/113.5 |
| 5,677,667 A * | 10/1997 | Lesesky | B60T 17/043 |
| | | | 439/35 |
| 5,739,592 A * | 4/1998 | Rigsby | B60D 1/62 |
| | | | 701/32.7 |
| 5,923,161 A * | 7/1999 | Frankovitch, Jr. | |
| | | | G01R 13/0218 |
| | | | 324/121 R |
| 6,097,998 A * | 8/2000 | Lancki | G01L 5/28 |
| | | | 701/34.3 |
| 6,114,952 A * | 9/2000 | Francesangeli | B60T 8/885 |
| | | | 340/687 |
| 6,222,443 B1 * | 4/2001 | Beeson | B60D 1/62 |
| | | | 340/539.1 |
| 9,738,125 B1 * | 8/2017 | Brickley | H04W 4/70 |
| 2009/0265057 A1 * | 10/2009 | Chinnadurai | G07C 5/085 |
| | | | 701/31.4 |
| 2009/0300548 A1 * | 12/2009 | Sullivan | G06F 3/0482 |
| | | | 715/830 |
| 2010/0271189 A1 * | 10/2010 | Miller | B60C 23/0408 |
| | | | 340/442 |
| 2018/0293811 A1 * | 10/2018 | Liu | G07C 5/0808 |
| 2021/0266373 A1 * | 8/2021 | Davis | H04L 67/535 |
| 2022/0034976 A1 * | 2/2022 | Palascak | G01R 33/0023 |
| 2023/0054729 A1 * | 2/2023 | Vinci | B60T 8/885 |
| 2023/0415716 A1 * | 12/2023 | Hurley | B60T 8/885 |

FOREIGN PATENT DOCUMENTS

| | | | | |
|---|---|---|---|---|
| WO | WO-9738408 A1 * | 10/1997 | | G08G 1/127 |
| WO | WO-2023110344 A1 * | 6/2023 | | B60D 1/07 |

\* cited by examiner

DIAGNOSTIC TOOL FOR ANTI-LOCK BRAKING SYSTEMS

FIELD OF THE INVENTION

The present invention relates generally to anti-lock braking systems (ABS systems), and, more particularly, to diagnostic tools for identifying faults in ABS systems.

BACKGROUND OF THE INVENTION

Most commercial semitrailers are equipped with an anti-lock braking system (ABS system). These ABS systems are typically controlled by an ABS electronic control unit (ABS ECU) that forms part of the ABS system. An ABS ECU continually monitors, controls, and reports such trailer dynamics as sway, ride height, and wheel slippage. When the ABS ECU detects an error, it generates a fault code. The status of that fault code is typically sent to the front of the semitrailer via the ABS power wire, which is traditionally positioned as the center pin on the 7-round pin connector found on the front of many semitrailers.

The fault code is usually sent via the power wire through a technology called power-line communications (PLC communications). In PLC communications, DC power and digital data are transmitted on the same wires. The Society of Automotive Engineers (SAE) has developed two main protocols that ABS manufacturers typically follow for broadcasting ABS data: SAE J1708 and SAE J1939. These two protocols define the physical and data link layers in the Open System Interconnection (OSI) Model. Data transmitted via these protocols may then be decoded with reference to the SAE J1587 Protocol, which details each fault code and how to access them. The SAE J1587 Protocol makes up the transport and application layers in the OSI Model.

There are two traditional methods for reading fault codes and other information generated by an ABS ECU in a semitrailer. In a first method, a cable from a tractor is plugged into the semitrailer and then the tractor's onboard diagnostics are used to identify if there are any active ABS faults while the tractor provides power to the semitrailer. In a second method, a diagnostic scan tool is plugged into the semitrailer. The diagnostic tool itself may provide power to the semitrailer or the user may attach another source of power.

In the semitrailer industry, there is a significant problem with wire and pin corrosion. Semitrailers are pulled behind a tractor, and as such, the tractor agitates particles and moisture on the road, and those particles and moisture are thrust toward the semitrailer with great pressure and from all angles. Despite wire harnesses being specifically engineered to prevent moisture and corrosion, these harnesses are statistically the most common failure point on semitrailer electrical systems. In fact, the power wire that supplies power to a semitrailer's ABS ECU has been reported as the most common electrical failure on semitrailers. Once the power wire is damaged, the ABS ECU may not power on correctly or may not power on at all. In addition, the PLC signals indicating ABS faults may be degraded so that these faults may become incomplete, intermittent, or non-existent. Existing diagnostic methods are not designed to recognize these kinds of issues and typically will simply show the ABS ECU as undetected. It is then up to a technician to troubleshoot the issue. Such troubleshooting can be very time consuming.

There is, as a results, a need for new diagnostic tools that can address the above-identified issues.

SUMMARY OF THE INVENTION

Embodiments of the present invention address the above-identified needs by providing new diagnostic tools for ABS systems in vehicles. These new diagnostic tools provide more precise indications of the source of an issue than prior art solutions, whether the issue be related to the ABS system powering on properly or whether the issue be related to PLC communications with the ABS system. The more precise indications lead to reduced troubleshooting time.

Aspects of the invention are directed to a diagnostic tool for an anti-lock braking system (ABS system). The diagnostic tool includes: a power line capable of being connected to the ABS system; a power supply operative to supply power over the power line; a microcontroller; a current-voltage monitor in signal communication with the microcontroller and operative to measure a load current on the power supply; and a user interface in signal communication with the microcontroller. With the power line attached to the ABS system, the microcontroller is operative to: (1) cause the power supply to power on the ABS system; (2) receive data from the current-voltage monitor representing a startup load current signature of the ABS system during startup; (3) analyze the startup load current signature to determine whether the ABS system is powering on normally or abnormally; and (4) cause one or more indications to display on the user interface based at least in part on the analysis.

Additional aspects of the invention are directed to a system containing a vehicle including an ABS system and a diagnostic tool. The diagnostic tool includes: a power line connected to the ABS system; a power supply operative to supply power over the power line; a microcontroller; a current-voltage monitor in signal communication with the microcontroller and operative to measure a load current on the power supply; and a user interface in signal communication with the microcontroller. The microcontroller is operative to: (1) cause the power supply to power on the ABS system; (2) receive data from the current-voltage monitor representing a startup load current signature of the ABS system during startup; (3) analyze the startup load current signature to determine whether the ABS system is powering on normally or abnormally; and (4) cause one or more indications to display on the user interface based at least in part on the analysis.

According to even additional aspects of the invention, a diagnostic tool configured in the manner set forth in either one of the preceding two paragraphs is further operative to conduct power-line communications (PLC communications) with the ABS system over the power line.

BRIEF DESCRIPTION OF THE DRAWINGS

These and other features, aspects, and advantages of the present invention will become better understood with regard to the following description and accompanying drawings where.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, a "vehicle" is any wheeled apparatus capable of transporting people or cargo. A semitrailer (or semi-trailer) is, for example, a form of vehicle. A "microcontroller" is an integrated circuit that contains a microprocessor along with memory and associated circuits and that controls some or all of the functions of an electronic device or system.

Aspects of the invention are directed to diagnostic tools for use with semitrailers having ABS systems. These diagnostic tools are better able to diagnose power and connection issues in those braking systems than prior art solutions.

Figure 1:
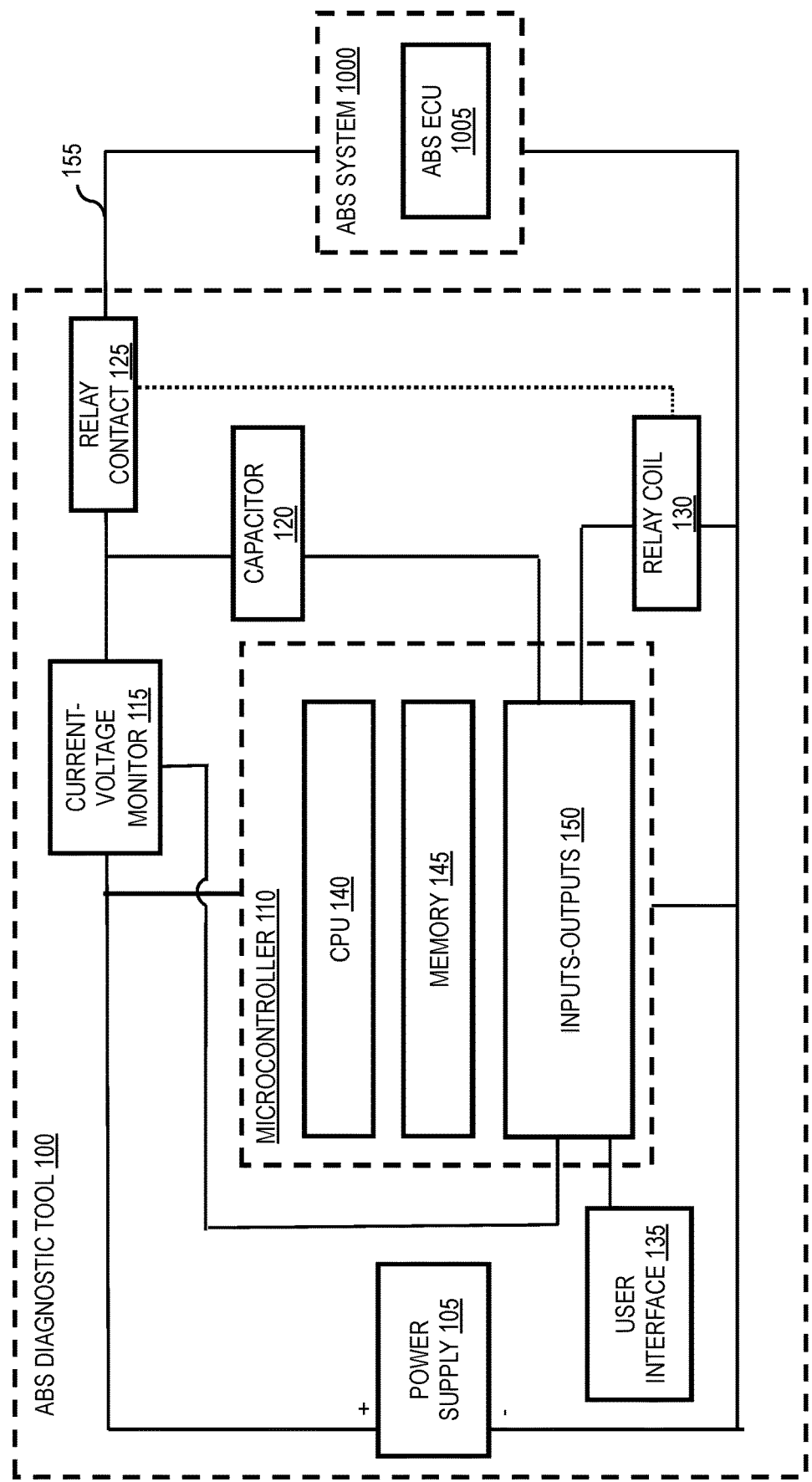
FIG. 1 shows a block diagram of an ABS diagnostic tool in accordance with an illustrative embodiment of the invention with the ABS diagnostic tool connected to an ABS system.

FIG. 1 shows a block diagram of an ABS diagnostic tool 100 (i.e., an apparatus) in accordance with an illustrative embodiment of the invention with the ABS diagnostic tool 100 connected to an ABS system 1000 of a semitrailer under test. The ABS diagnostic tool 100 includes: a power supply 105, a microcontroller 110, a current-voltage monitor 115, a capacitor 120, a relay contact 125, a relay coil 130, and a user interface 135. The ABS system 1000 includes an ABS ECU 1005 as well as several other components (e.g., sensors, valves, lights, etc.), which are not explicitly shown.

The microcontroller 110 comprises a central processing unit (CPU) 140 (i.e., logic circuitry), a memory 145, and inputs-outputs 150. Because the elements within the microcontroller 110 are largely conventional, they will be familiar to one skilled in the art. Moreover, microcontrollers are described in several readily available references, including K. J. Ayala, *The* 8051 *Microcontroller*, Cengage Learning, 2004, which is hereby incorporated by reference herein. Very generally, the CPU 140 is operative to perform logic and management functions, and may comprise its own memory portions (e.g., registers and CPU cache). Nonvolatile and volatile memory within the memory 145 is operative to store program instructions, operating parameters, and data. The nonvolatile memory may comprise, for example, read-only memory (ROM) such as mask-programmed ROM, programmable ROM (PROM), erasable PROM (EPROM), electrically-erasable PROM (EEPROM), flash memory, or a combination thereof. The volatile memory may, for example, comprise random access memory (RAM) such as dynamic RAM (DRAM), static RAM (SRAM), or a combination thereof. Lastly, pins on the microcontroller 110 provide the inputs-outputs 150. An analog-to-digital converter may also form part of the inputs-outputs 150. Oscillators, interrupts, serial interfaces, timers, and other conventional elements in microcontrollers may also be present in the microcontroller 110, but these additional elements are not explicitly shown in FIG. 1 for economy of description.

Suitable candidates for the microcontroller 110 include, for example, a PIC24FJ128GB106 General Purpose USB Microcontroller, available from Microchip Technology Corp. (Chandler, AZ, US). Once the functions of the microcontroller 110 are understood from the teachings herein, those functions may be programmed by one having ordinary skill in the programming arts. The programming of a microcontroller is, moreover, described in many readily available references, including, as just one example, J. R. Smith, *Programming the PIC Microcontroller with MBASIC*, Newnes, 2005, which is also hereby incorporated by reference herein.

The microcontroller 110, via the inputs-outputs 150, is operative to receive inputs from and send outputs to the user interface 135. Notably, the user interface 135 may be physically removed from (i.e., physically remote to) the remainder of the diagnostic tool 100 and communications between the microcontroller 110 and the user interface 135 may be by wire, by wireless communication, via a network, or by some combination thereof. The microcontroller 110 also controls the relay coil 130. The relay coil 130, in turn, controls the open-closed state of the relay contact 125.

In the present illustrative embodiment, the power supply 105 supplies twelve volts of direct current (12V DC). Wiring from the power supply 105 allows the power supply 105 to power the microcontroller 110. At the same time, a power line 155 from the power supply 105 also allows the ABS diagnostic tool 100 to power the ABS system 1000 if the relay contact 125 is closed. With the relay contact 125 closed, the current-voltage monitor 115 is operative to measure the voltage at the current-voltage monitor 115 and the current going to the ABS system 1000. The load current of the ABS system 1000 is the electrical current required by the ABS system 1000 (i.e., the load receiving the power) and provided by the power supply 105 (i.e., the power source providing the power).

Figure 2:
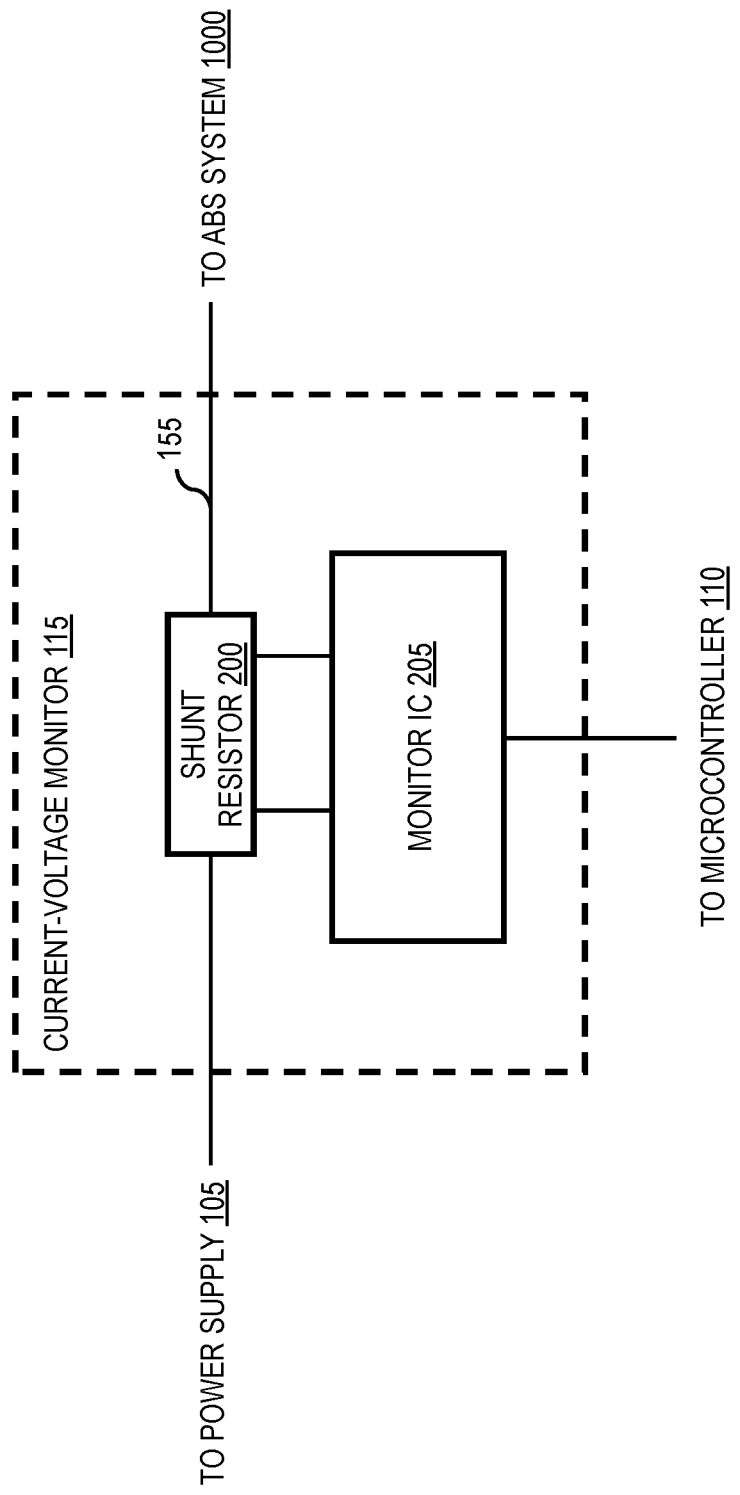
FIG. 2 shows a block diagram of the current-voltage monitor in the FIG. 1 ABS diagnostic tool.

FIG. 2 shows a block diagram of the current-voltage monitor 115 in the present illustrative embodiment. The current-voltage monitor comprises a shunt resistor 200 on the power line 155 (i.e., the line from the power supply 105 to the ABS system 1000). A monitor integrated circuit (IC) 205 reads the voltage and current at the shunt resistor 200. The voltage and current data from the monitor IC 205 is sent to the microcontroller 110 through the inputs-outputs 150. Suitable candidates for the monitor IC 205 include the INA226 Bi-directional Current/Power Monitor from Texas Instruments (Dallas, TX, US).

At the same time, the microcontroller 110, again via inputs-outputs 150, is able to conduct PLC communications with the ABS system 1000. Communications may be conducted in accordance with the SAE J1587 Protocol. The capacitor 120 stands between the inputs-outputs 150 and the wiring going from the power supply 105 to the ABS system 1000. The capacitor 120 stops significant electrical current on the power wiring from entering the inputs-outputs 150 of the microcontroller 110 so that only the PLC communications are transmitted to the microcontroller 110.

Accordingly, a user may connect the ABS diagnostic tool 100 to the ABS system 1000 of a semitrailer under test. The ABS diagnostic tool 100 includes the microcontroller 110, the current-voltage monitor 115 in signal communication with the microcontroller 110, and the user interface 135 in signal communication with the microcontroller 110. The microcontroller 110 may turn on power to the ABS system 1000, read the load current characteristics of the ABS system 1000 via the current-voltage monitor 115, and communicate with the ABS system 1000 via PLC communications. PLC communications is via the same wiring used to power the ABS system 1000. Based on the load current characteristics of the ABS system 1000, the microcontroller 110 is operative to indicate whether the ABS system 1000 is powering on normally or abnormally. Based on the PLC communications with the ABS system 1000, the microcontroller 110 is also operative to indicate whether communications with the ABS system 1000 is normal or abnormal.

Figure 3:
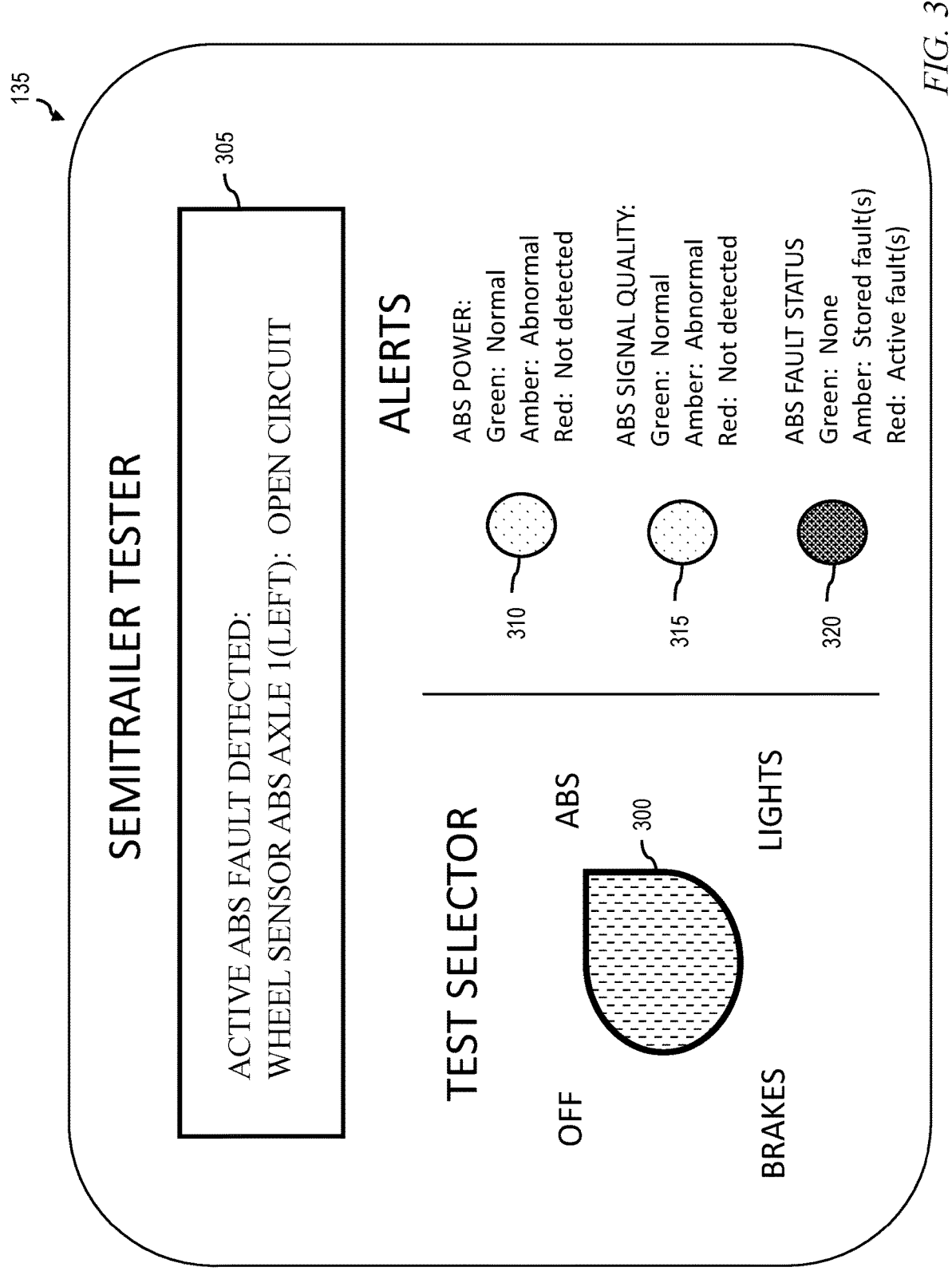
FIG. 3 shows a visual representation of the user interface in the FIG. 1 ABS diagnostic tool.

FIG. 3 shows a visual representation of the user interface 135 of the ABS diagnostic tool 100. The user interface 135 comprises a test selector knob 300, a display 305 (e.g., liquid crystal display; LCD), and three alert lights: a power alert light 310, labeled ABS POWER; a signal alert light 315, labeled ABS SIGNAL QUALITY; and a fault alert light 320, labeled ABS FAULT STATUS. Each of the alert lights 310, 315, 320 is a multicolor light-emitting diode (i.e., an RGB LED). Textual descriptions of differently colored lights are also provided on the user interface 135 next to each alert light 310, 315, 320.

Figure 4:
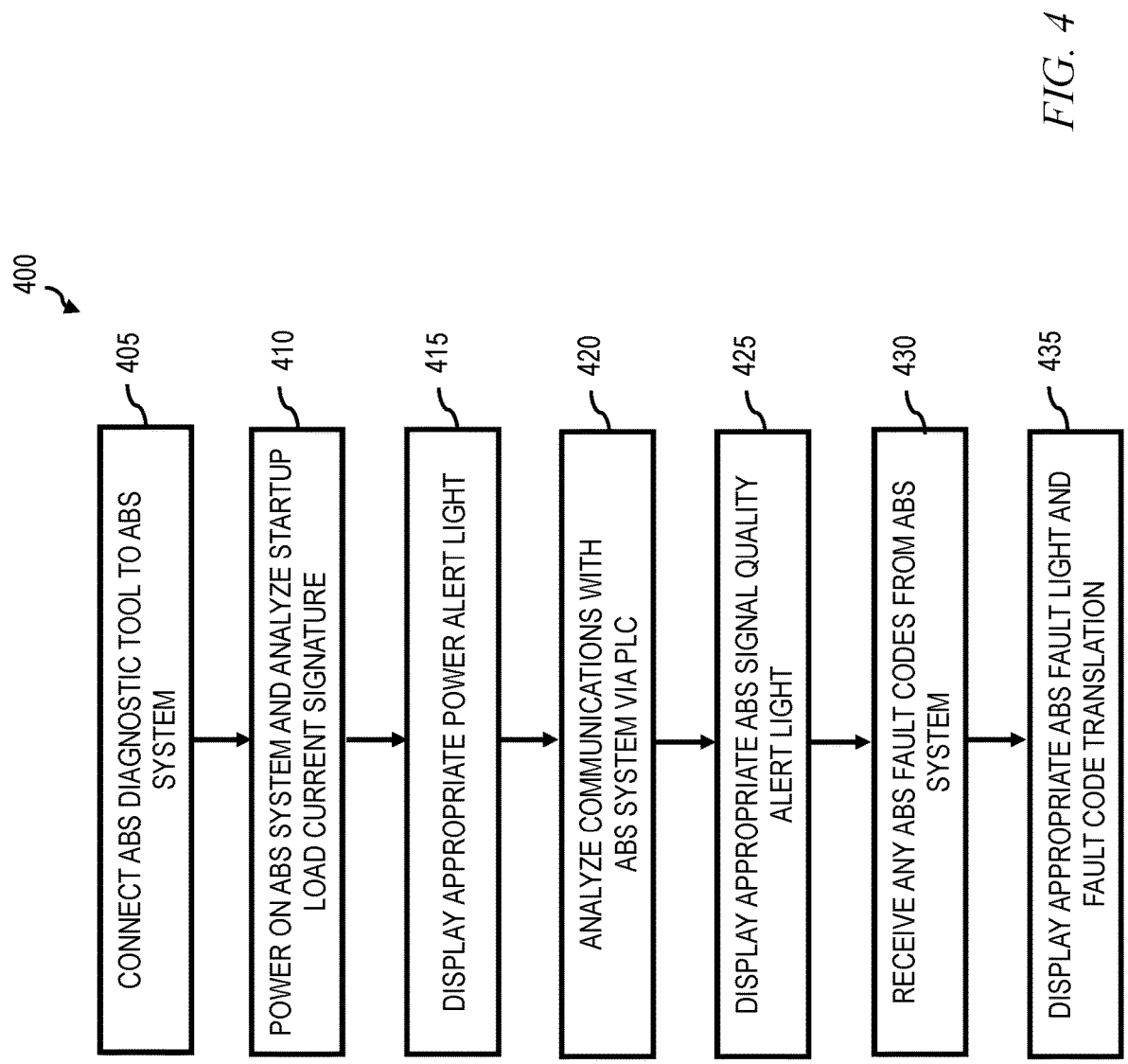
FIG. 4 shows a flow diagram of a method of utilizing the FIG. 1 diagnostic tool to troubleshoot the FIG. 1 ABS system.

FIG. 4 shows a flow diagram of a method 400 of utilizing the ABS diagnostic tool 100 to troubleshoot the ABS system 1000. In step 405, the ABS diagnostic tool 100 is connected to the ABS system 1000. If the semitrailer includes a SAE J560 7-round pin trailer-type connector, for example, the ABS diagnostic tool 100 may be provided with the corresponding adapter for easy connection. Typically, the center pin is the ABS power pin and the one used for PLC communications. A ground pin is also provided and is typically colored white.

The semitrailer's ABS system 1000 forms a load acting on the power supply 105. In step 410, the ABS diagnostic tool 100 powers on the ABS system 1000 and monitors the load current of the ABS system 1000 over a predetermined amount of time after startup. Load current versus time for that predetermined time forms the "startup load current signature" for the ABS system 1000. The microcontroller 110 may establish power to the ABS system 1000 by powering on the relay coil 130 and thereby closing the relay contact 125. The microcontroller 110 then receives the startup load current signature from the current-voltage monitor 115. Once received, the microcontroller 110 stores the received startup load current signature in the memory 145.

A typical ABS system will run a series of self-tests upon being powered up. These power-up self-tests may include activating different sensors, valves, and other elements within the semitrailer's ABS system to verify their connection and basic functionality. These power-up self-tests have particular startup load current signatures. An exemplary ABS system may, for example, have a baseline load current of, for example, 80 to 100 milliamps (mA). During startup, several higher load current pulses are superimposed on the baseline load current level as the ABS system exercises its constituent elements. The higher current pulses may each, for example, have amplitudes of 200 to 300 mA.

The microcontroller 110 is preprogrammed with the parameters of normal (i.e., expected) startup load current signatures for a variety of different semitrailer ABS systems. In step 410, the ABS diagnostic tool 100 compares the received startup load current signature received from the ABS system 1000 to these preprogrammed normal parameters.

In one or more embodiments, for example, the ABS diagnostic tool 100 simply determines the average load current of the ABS system 1000 in the received startup load current signature. If that average load current falls within the preprogrammed normal parameters for the ABS system 1000, then the ABS diagnostic tool 100 determines that the startup load current signature is normal. Otherwise, an abnormal condition is determined. In alternative embodiments, a more complex analysis is performed. Here, the ABS diagnostic tool 100 looks at the dynamics (i.e., magnitude and timing characteristics) of the received startup load current signature and compares it to the preprogrammed normal parameters to determine whether the received startup load current signature is normal or abnormal. If, for example, the load current peaks in the received startup load current signature are lower than expected, then the ABS diagnostic tool 100 concludes that there is an abnormal condition.

The ABS diagnostic tool 100 then progresses to step 415, wherein the ABS diagnostic tool 100 illuminates the power alert light 310 with the appropriate color. If the analysis in step 410 suggests that the ABS system 1000 powered up normally, then a green light is displayed. If the analysis in step 410 suggests that the ABS system 1000 powered up abnormally, then a yellow light is displayed. Finally, if the ABS system 1000 was not detected in step 410, then a red light is displayed.

Next, in step 420, the ABS diagnostic tool 100 attempts to communicate with the ABS system 1000 via PLC communications. The ABS diagnostic tool 100 may, for example, send one or more commands to the ABS ECU 1005 that instigate known responses from the ABS ECU 1005. The ABS diagnostic tool 100 then looks for normal responses to its outgoing commands. In response to a command from the ABS diagnostic tool 100 requesting a "component ID," for example, the ABS diagnostic tool 100 should receive a message from the ABS ECU 1005 identifying the make, model, and serial number of that component in the semitrailer. A different response from the ABS ECU 1005, or a non-existent or garbled response, suggests an issue. Additionally, messages sent in accordance with the SAE J1587 Protocol conclude with checksum values that may be used to verify data integrity. The checksum value is one byte long and consists of the two's complement to the sum of all data bytes in the message. If the message is valid, the sum modulo 256 of all bytes in a message, including the checksum, is zero. If not, an issue with the PLC communications is strongly suggested, particularly if a checksum error is encountered with several received messages.

Next, in step 425, the ABS diagnostic tool 100 illuminates the signal alert light 315 with the appropriate color. If the analysis in step 420 suggests normal communications with the ABS system 1000, then a green light is displayed. If the analysis in step 420 suggests abnormal communications with the ABS system 1000, then a yellow light is displayed. Finally, if the ABS diagnostic tool 100 fails entirely to communicate with the ABS system 1000 in step 420, a red light is displayed.

In step 430, the ABS diagnostic tool 100 commands the ABS ECU 1005 to transmit any stored and active ABS fault codes. In accordance with SAE J1587, the returned fault codes may contain a subsystem identifier (SID) and a failure mode identifier (FMI), as well as other data. The SID identifies the particular component within the semitrailer's ABS system with a fault. The FMI indicates the type of failure. In accordance with aspects of the invention, a translation table for these ABS fault codes is already preprogrammed into the memory 145 of the microcontroller 110.

In step 435, the ABS diagnostic tool 100 illuminates the fault alert light 320 with the appropriate condition determined in step 430. If no fault codes are received from the ABS ECU 1005, then a green light is displayed. If only stored fault codes are received, then a yellow light is displayed. Finally, if an active fault code is received, a red light is displayed. At the same time, a translation of the fault code is displayed in text on the display 305. In the exemplary user interface 135 in FIG. 3, for example, an active fault for an issue with an open circuit in a wheel sensor is displayed.

These faults may also be communicated via wire or wirelessly to a device separate from the ABS diagnostic tool 100 such as, for example, a laptop computer, a smartphone, or a tablet computer.

Configured and functioning in this manner, the ABS diagnostic tool 100, and, more generally, diagnostic tools in accordance with aspects of the invention, provide several advantages over prior art diagnostic tools. When an ABS system under test fails to power on correctly, a prior-art diagnostic tool will typically indicate that the ABS system is simply undetected. Correspondingly, when PLC communications with the ABS ECU is degraded or non-existent, prior-art diagnostic tools will again indicate that the ABS system is undetected. With these imprecise descriptions of the actual issues, a technician is left to troubleshoot largely by trial and error. These troubleshooting techniques may consume large amounts of time depending on the problem.

The ABS diagnostic tool 100, in contrast, precisely indicates the source of an issue, whether that be related to an ABS system powering on properly or an issue with communications with the ABS system via PLC communications. If, for example, the ABS system 1000 fails to power on or powers on incompletely, the ABS diagnostic tool 100 will display an ABS POWER: NOT DETECTED or ABS POWER: ABNORMAL indication. If PLC communications with the ABS system 1000 is non-existent or degraded, the ABS diagnostic tool 100 will display an ABS SIGNAL QUALITY: NOT DETECTED or ABS SIGNAL QUALITY: ABNORMAL indication.

The ABS diagnostic tool 100 also provides ABS fault codes for the ABS system 1000 in a translated format that is easy to understand and includes information on whether a fault is stored or active. This too eliminates unnecessary guesswork and quickly alerts a technician to exactly the condition of the semitrailer's ABS system 1000.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A diagnostic tool for an anti-lock braking system (ABS system), the diagnostic tool comprising:
   a power line capable of being connected to the ABS system;
   a power supply operative to supply power over the power line;
   a microcontroller;
   a current-voltage monitor in signal communication with the microcontroller and operative to measure a load current on the power supply; and
   a user interface in signal communication with the microcontroller;
   wherein, with the power line attached to the ABS system, the microcontroller is operative to:
      cause the power supply to power on the ABS system;
      receive data from the current-voltage monitor representing a startup load current signature of the ABS system during startup;
      analyze the startup load current signature to determine whether the ABS system is powering on normally or abnormally; and
      cause one or more indications to display on the user interface based at least in part on the analysis.

2. The diagnostic tool of claim 1, wherein the power line terminates in a trailer-type connector comprising a power pin and a ground pin.

3. The diagnostic tool of claim 1, wherein the microcontroller comprises:
   memory;
   logic circuitry coupled to the memory; and
   input and output circuitry coupled to the logic circuitry.

4. The diagnostic tool of claim 1, wherein, with the power line attached to the ABS system, the microcontroller is further operative to store the startup load current signature.

5. The diagnostic tool of claim 1, wherein parameters of a normal startup load current signature of the ABS system are preprogrammed into the microcontroller.

6. The diagnostic tool of claim 5, wherein analyzing the startup load current signature comprises comparing the startup load current signature with the parameters of the normal startup load current signature.

7. The diagnostic tool of claim 1, wherein, with the power line attached to the ABS system, the microcontroller is further operative to conduct power-line communications (PLC communications) with the ABS system over the power line.

8. The diagnostic tool of claim 7, wherein, with the power line attached to the ABS system, the microcontroller is further operative to determine whether PLC communications with the ABS system is normal or abnormal.

9. The diagnostic tool of claim 8, wherein determining whether PLC communications with the ABS system is normal or abnormal comprises sending a PLC command to the ABS system and determining if a response is an expected response.

10. The diagnostic tool of claim 8, wherein determining whether PLC communications with the ABS system is normal or abnormal comprises utilizing checksum values to verify data integrity.

11. The diagnostic tool of claim 7, wherein, with the power line attached to the ABS system, the microcontroller is further operative to command the ABS system to transmit any existing ABS fault codes via PLC communications.

12. The diagnostic tool of claim 11, wherein, with the power line attached to the ABS system, the microcontroller is further operative to display the any existing ABS fault codes on the user interface.

13. The diagnostic tool of claim 12, wherein a translation table for ABS fault codes for the ABS system is preprogrammed into the microcontroller.

14. The diagnostic tool of claim 13, wherein, with the power line attached to the ABS system, the microcontroller is further operative to display a translation of the any existing fault codes on the user interface.

15. The diagnostic tool of claim 1, wherein the current-voltage monitor comprises:
   a shunt resistor on the power line; and
   monitor circuitry operative to measure voltage and current at the shunt resistor and send data representative of those electrical parameters to the microcontroller.

16. The diagnostic tool of claim 1, further comprising:
   a relay contact on the power line operative to create an open and closed state in the power line; and
   a relay coil operative to control the relay contact, the relay coil controlled at least in part by the microcontroller.

17. A system comprising:
a vehicle comprising an ABS system; and
a diagnostic tool comprising:
- a power line connected to the ABS system;
- a power supply operative to supply power over the power line;
- a microcontroller;
- a current-voltage monitor in signal communication with the microcontroller and operative to measure a load current on the power supply; and
- a user interface in signal communication with the microcontroller;
- wherein the microcontroller is operative to:
  - cause the power supply to power on the ABS system;
  - receive data from the current-voltage monitor representing a startup load current signature of the ABS system during startup;
  - analyze the startup load current signature to determine whether the ABS system is powering on normally or abnormally; and
  - cause one or more indications to display on the user interface based at least in part on the analysis.

18. The system of claim 17, wherein the vehicle comprises a semitrailer.

19. The system of claim 17, wherein the ABS system comprises an electronic control unit.

20. The system of claim 17, wherein the ABS system performs self-tests upon being powered up that affect the load current of the ABS system.

* * * * *